US012681820B2

(12) United States Patent　　　(10) Patent No.:　US 12,681,820 B2
Ikeda et al.　　　(45) Date of Patent:　　　Jul. 14, 2026

(54) DETERMINATION APPARATUS, TEST SYSTEM, DETERMINATION METHOD, AND COMPUTER-READABLE MEDIUM

(71) Applicant: ADVANTEST CORPORATION, Tokyo (JP)

(72) Inventors: Kosuke Ikeda, Saitama (JP); Hajime Sugimura, Saitama (JP)

(73) Assignee: ADVANTEST CORPORATION, Tokyo (JP)

( * ) Notice: Subject to any disclaimer, the term of this patent is extended or adjusted under 35 U.S.C. 154(b) by 267 days.

(21) Appl. No.: 17/832,713

(22) Filed: Jun. 6, 2022

(65) Prior Publication Data

US 2022/0300390 A1　　Sep. 22, 2022

Related U.S. Application Data

(63) Continuation of application No. PCT/JP2021/001134, filed on Jan. 14, 2021.

(30) Foreign Application Priority Data

Mar. 10, 2020　(JP) ................................ 2020-041371

(51) Int. Cl.
G06F 11/27　　　(2006.01)
G01M 99/00　　　(2011.01)
G06F 11/34　　　(2006.01)

(52) U.S. Cl.
CPC ........... G06F 11/27 (2013.01); G01M 99/008 (2013.01); G06F 11/3409 (2013.01)

(58) Field of Classification Search
CPC ...... G06F 11/27; G06F 11/3409; G06F 11/26; G01M 99/008; H01L 22/20; G01R 31/26;
(Continued)

(56) References Cited

U.S. PATENT DOCUMENTS 6,274,395 B1　8/2001　Weber
2003/0005377 A1*　1/2003　Debenham ....... G01R 31/31718
714/724
(Continued)

FOREIGN PATENT DOCUMENTS

CN　　101646954 A　　2/2010
CN　　109426698 A　　3/2019
(Continued)

OTHER PUBLICATIONS

Office Action issued for counterpart Taiwanese Application 110101371, transmitted from the Taiwan Intellectual Property Office on Mar. 5, 2024 (issued on Feb. 29, 2024).
(Continued)

*Primary Examiner* — Lee E Rodak
*Assistant Examiner* — Byung Ro Lee

(57)　　　ABSTRACT

There is provided a determination apparatus including: a result acquisition unit configured to acquire test results of tests on a plurality of items which are performed on a device under measurement; and a first determination unit configured to determine whether to retest a device under measurement that has failed the test, in which the first determination unit is configured to perform the determination based on reproducibility of the test results in a case where the tests have been performed on a plurality of devices under measurement multiple times in advance.

16 Claims, 6 Drawing Sheets

(58) Field of Classification Search
CPC .. G01R 31/28; G01R 31/31707; G01R 31/01;
G01R 31/287; G01R 31/2894; G06N
20/00
USPC ......................................................... 702/117
See application file for complete search history.

(56) References Cited

U.S. PATENT DOCUMENTS

| | | | |
|---|---|---|---|
| 2004/0216537 A1* | 11/2004 | Schuntermann ... | G01R 31/2894 |
| | | | 209/552 |
| 2005/0267706 A1 | 12/2005 | Balchiunas | |
| 2007/0198955 A1 | 8/2007 | Nagatomo | |
| 2008/0094096 A1 | 4/2008 | Kishimoto | |
| 2010/0026329 A1 | 2/2010 | Watanabe | |
| 2011/0131162 A1 | 6/2011 | Kaushal | |
| 2012/0126116 A1 | 5/2012 | Tanaka | |
| 2013/0115722 A1 | 5/2013 | Nakagawa | |
| 2015/0369857 A1 | 12/2015 | Nakamura | |
| 2017/0059491 A1 | 3/2017 | Duffy | |
| 2017/0301079 A1 | 10/2017 | Cho | |
| 2018/0074096 A1 | 3/2018 | Absher | |
| 2018/0107928 A1 | 4/2018 | Zhang | |
| 2019/0004504 A1 | 1/2019 | Yati | |
| 2019/0065630 A1 | 2/2019 | Kim | |
| 2022/0300390 A1 | 9/2022 | Ikeda | |

FOREIGN PATENT DOCUMENTS

| | | |
|---|---|---|
| CN | 110770886 A | 2/2020 |
| CN | 116338424 A | 6/2023 |
| JP | H05223873 A | 9/1993 |
| JP | H06258387 A | 9/1994 |
| JP | 2004055837 A | 2/2004 |
| JP | 2005010069 A | 1/2005 |
| JP | 2006025100 A | 1/2006 |
| JP | 2007164256 A | 6/2007 |
| JP | 2007227618 A | 9/2007 |
| JP | 2007285906 A | 11/2007 |
| JP | 2008500737 A | 1/2008 |
| JP | 2008122362 A | 5/2008 |
| JP | 2010267689 A | 11/2010 |
| JP | 2010278073 A | 12/2010 |
| JP | 2011033423 A | 2/2011 |
| JP | 2011517807 A | 6/2011 |
| JP | 2013002467 A | 1/2013 |
| JP | 2013024671 A | 2/2013 |
| JP | 2013238526 A | 11/2013 |
| JP | 2016006392 A | 1/2016 |
| JP | 2017044480 A | 3/2017 |
| JP | 2017194448 A | 10/2017 |
| JP | 2018059912 A | 4/2018 |
| JP | 2021143880 A | 9/2021 |
| TW | 201725381 A | 7/2017 |
| TW | 201816670 A | 5/2018 |

OTHER PUBLICATIONS (ISA/237) Written Opinion of the International Search Authority for International Patent Application No. PCT/JP2021/001134, issued/ mailed by the Japan Patent Office on Apr. 6, 2021.
Office Action issued for counterpart Japanese Application No. 2020-041371, transmitted from the Japanese Patent Office on Feb. 20, 2024 (drafted on Feb. 8, 2024).
Office Action issued for counterpart Japanese Application No. 2020-041371, transmitted from the Japanese Patent Office on Nov. 7, 2023 (drafted on Oct. 31, 2023).
Office Action issued for counterpart Japanese Application No. 2020-041371, transmitted from the Japanese Patent Office on Jun. 4, 2024 (drafted on May 27, 2024).
Office Action issued for counterpart Chinese Application 202180007757. 1, issued by The State Intellectual Property Office of People's Republic of China on Oct. 28, 2024.
Office Action issued for related German Application, issued by the German Patent and Trade Mark Office on Jun. 24, 2025.
Office Action issued for related Korean Application 10-2024-0058732, issued by the Korean Intellectual Property Office on Jun. 10, 2025.
Office Action issued for related U.S. Appl. No. 18/646,654, issued by the US Patent and Trademark Office on Oct. 27, 2025.

* cited by examiner

DETERMINATION APPARATUS, TEST SYSTEM, DETERMINATION METHOD, AND COMPUTER-READABLE MEDIUM

The contents of the following Japanese patent application are incorporated herein by reference:
2020-041371 filed in JP on Mar. 10, 2020
PCT/JP2021/001134 filed in WO on Jan. 14, 2021

BACKGROUND

1. Technical Field

The present invention relates to a determination apparatus, a test system, a determination method, and a computer-readable medium.

2. Related Art

When a device under measurement is tested, due to a poor contact or the like, a determination may be erroneously made that the test has failed. Therefore, in the related art, the device under measurement, which has failed the test, is retested to prevent a decrease in yield.

DESCRIPTION OF EXEMPLARY EMBODIMENTS

Hereinafter, the present invention will be described through embodiments of the invention, but the following embodiments do not limit the invention according to the claims. In addition, not all the combinations of features described in the embodiments are essential for means to solve the problem in the invention.

1. Test System 1

Figure 1:
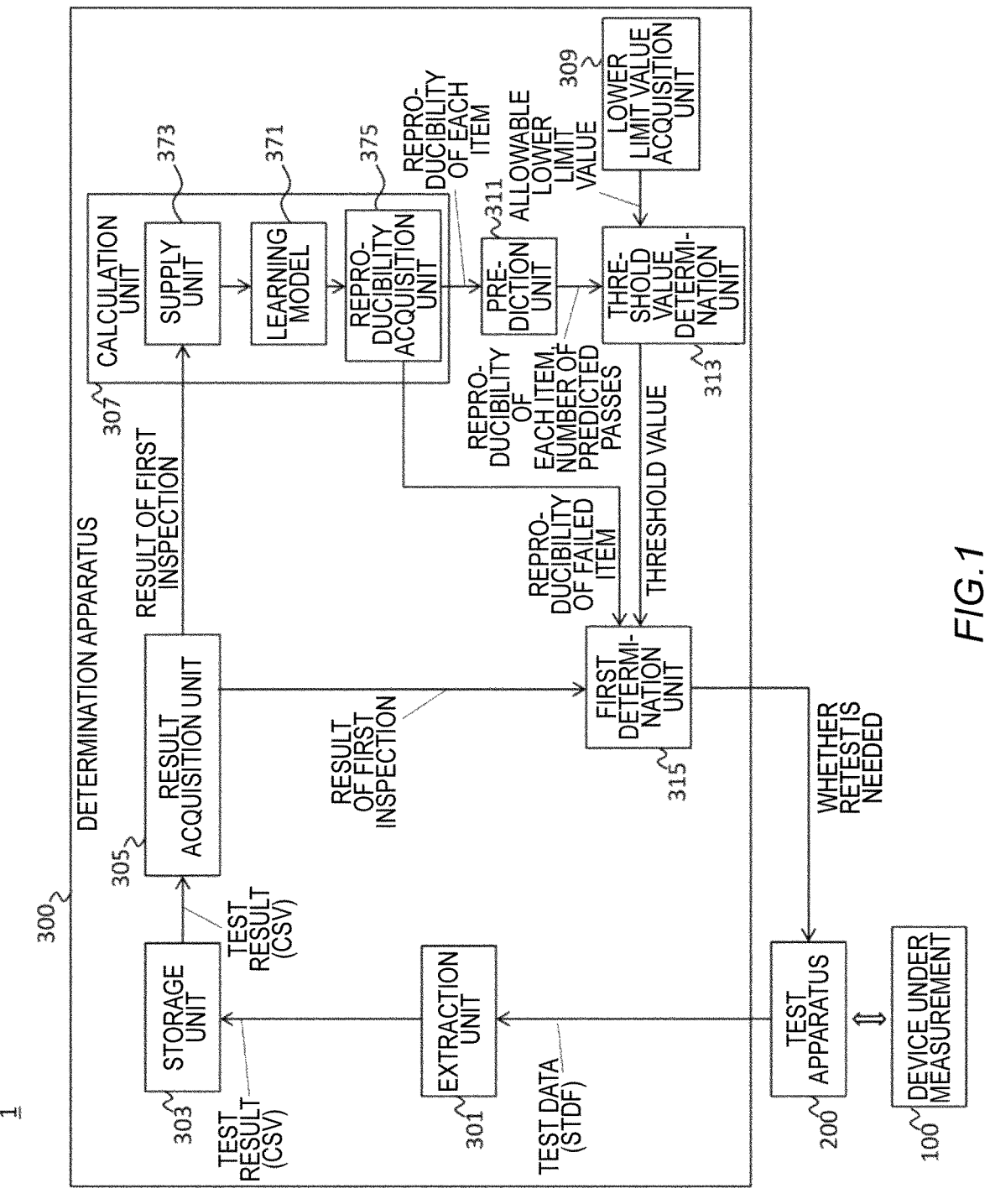
FIG. 1 shows a test system 1 according to the present embodiment.

FIG. 1 shows a test system 1 according to the present embodiment. The test system 1 includes a device under measurement 100, a test apparatus 200, and a determination apparatus 300. The test apparatus 200 and the determination apparatus 300 may be integrally formed as a single apparatus.

[1-1. Device Under Measurement 100]

The device under measurement 100 may be, for example, an electronic device such as a semiconductor or a Micro Electro Mechanical Systems (MEMS). A plurality of devices under measurement 100 may be formed on one wafer, or the device under measurement 100 may have a shape of a bare chip which is obtained by dicing and singulating the wafer, or may be put in a package in a sealing manner.

[1-2. Test Apparatus 200]

The test apparatus 200 tests one or more devices under measurement 100. The test apparatus 200 may perform a test of a single item, or may perform tests of a plurality of items (1000 to 2000 items as an example) in parallel or in order. For example, when the device under measurement 100 is a packaged electronic device, any two or more items among the plurality of items included in the test may be test items belonging to the same category such as an audio function. As an example in the present embodiment, the test apparatus 200 tests, in order the plurality of devices under measurement 100 on the wafer for the plurality of items.

The test apparatus 200 may be a device test apparatus such as a system LSI tester, an analog tester, a logic tester, or a memory tester. The test apparatus 200 gives various test signals to the device under measurement 100, and acquires response signals from the device under measurement 100. The test apparatus 200 may supply a data file, which is obtained by the test of each item, to the determination apparatus 300 in a wired manner or a wireless manner. The data file of the test, which is supplied from the test apparatus 200, may be in a format of an STDF (Standard Test Data Format) as an example in the present embodiment, and may include a lot number and a wafer number of the device under measurement 100, a device ID of the device under measurement 100, an item ID of a test item, a measured value for each item, a test result for each item (as an example in the present embodiment, a determination value "0" and "1" of pass/failure), or the like. The data file may be in a form of a data log or a test log.

Here, in the test by the test apparatus 200, an error may occur in the test result due to a surface stain of the device under measurement 100, a poor contact of the test apparatus 200, or the like, and even the device under measurement 100 that has failed a first test (also referred to as a first inspection) may pass a second test (also referred to as a reinspection or a retest). Therefore, in the test system in the related art, the device under measurement that has failed the first inspection is retested to prevent a decrease in yield.

However, if the devices under measurement, which have failed the first inspection, are uniformly retested, even defective products that are not likely to pass from the outset is retested in vain. Therefore, in the test system 1 according to the present embodiment, the determination apparatus 300 determines whether to reinspect the device under measurement 100 that has failed the first inspection. It should be noted that the expression of failing the test may mean failing in at least one item included in the test. The reinspection may be a so-called reprobe in which the test apparatus 200 is caused to recontact the device under measurement 100 and the test is performed again. In a case where the device under measurement 100 is fixed to the test apparatus 200 and then a probe is caused to contact the device under measurement 100, the fixed state may be canceled or may not be canceled after the first inspection.

[1-3. Determination Apparatus 300]

The determination apparatus 300 has an extraction unit 301, a storage unit 303, a result acquisition unit 305, a calculation unit 307, a lower limit value acquisition unit 309, a prediction unit 311, a threshold value determination unit 313, and a first determination unit 315.

[1-3-1. Extraction Unit 301]

The extraction unit 301 is configured to acquire the data file (the STDF file as an example in the present embodiment) of the test from the test apparatus 200, and extract the test result (the determination value of the pass/failure as an example in the present embodiment) of each item from the data file. In addition to the test result, the extraction unit 301 may extract in advance, from the data file, the item ID of a corresponding test, the device ID and the lot number of the device under measurement 100, and the like for a conversion into a CSV (comma-separated values) file. The extraction unit 301 may supply the extracted data to the storage unit 303.

[1-3-2. Storage Unit 303]

The storage unit 303 is configured to store the test result (the determination value of the pass/failure as an example in the present embodiment) extracted by the extraction unit 301. The storage unit 303 may further store the item ID of the test, the device ID and the lot number of the device under measurement 100, and the like in association with the test result. The data stored in the storage unit 303 may be able to be read by the result acquisition unit 305.

[1-3-3. Result Acquisition Unit 305]

The result acquisition unit 305 acquires test results of the plurality of items performed on the device under measurement 100. As an example in the present embodiment, the result acquisition unit 305 may acquire the test result from the storage unit 303. The result acquisition unit 305 may acquire, together with the test result of each item, the item ID of the item and the device ID of the device under measurement 100, from the storage unit 303. The result acquisition unit 305 may supply the test result or the like in the first inspection, to the calculation unit 307 and the first determination unit 315.

[1-3-4. Calculation Unit 307]

The calculation unit 307 calculates reproducibility of the test result when the tests are performed on the plurality of devices under measurement 100 multiple times (twice as an example in the present embodiment) in advance. The calculation unit 307 may supply a value of the calculated reproducibility to the first determination unit 315 and the prediction unit 311.

The reproducibility may be an index indicating a degree that the same test result (the determination value of the pass/failure as an example in the present embodiment) is reproduced, and indicates, for example, a degree that the test result of a failure in the first inspection is reproduced in the reinspection. The higher the reproducibility is, the more likely it is that the result of the reinspection is a failure and a time required for the reinspection is wasted, or the like, and thus the reproducibility may be an index indicating ineffectiveness of the reinspection.

As an example, the reproducibility may be a rate at which the test result of a failure is reproduced (also referred to as a reproduction rate). Instead of this, the reproducibility may be the number of failures which is predicted in the reinspection (also referred to as the number of failures predicted in the reinspection). The number of failures predicted in the reinspection may be a value obtained by subtracting the number of predicted passes in the reinspection from the number (also referred to as the number of failures in the first inspection) of devices under measurement 100 that have failed the first inspection, or may be a value obtained by multiplying the reproduction rate and the number of the devices under measurement 100 that have failed the first inspection for the reference number of the devices under measurement 100. The reference number may be the number of the devices under measurement 100 included in the wafer, and may be 100 to 10000 as an example.

The reproducibility may be a value for each of the plurality of items, and may indicate that in one item, when the result of the first inspection is a failure, the result of the reinspection is a failure. As an example in the present embodiment, a fact that the result of the reinspection is a failure may mean that the result of the reinspection is a failure in any item included in the test, but may also mean that the result of the reinspection is a failure in the same item as the first inspection.

As an example in the present embodiment, the calculation unit 307 calculates the reproducibility by using a learning model 371. The calculation unit 307 includes a learning model 371, a supply unit 373, and a reproducibility acquisition unit 375.

[1-3-5 (1). Learning Model 371]

The learning model 371 is configured to output a prediction result of the reinspection according to inputs of the test results of the plurality of items.

The learning model 371 may be generated by learning processing using training data including a test result of the reinspection performed on the device under measurement 100 that has failed the first inspection. The training data may include at least the item ID of the failed item among the respective items of the test, and the result of the reinspection. When the test of one item is a failure in the first inspection, the test result of the reinspection may show only the result of the test of the one item, may show the result of the test of each item, or may show only an overall result of the test. The training data may further include a position of the device under measurement 100 on the wafer, an amount of deviation between the measured value and an ideal value, and the like.

The learning model 371 is a machine learning algorithm of a random forest as an example in the present embodiment, but may be another machine learning algorithm including a support vector machine (SVM), a K-nearest neighbor method, logistic regression, or the like.

The learning model 371 may be trained with a pass as 0 and a failure as 1 for the result of each item of the test, and may output a value closer to 1 as a possibility that the result of the reinspection is a failure is high. Thereby, when the test result (that is, 1) indicating a failure is input for the test of a certain item, an output value is close to 1 as the possibility that the result of the reinspection is a failure again is high. Therefore, the prediction result that is output can show the reproducibility for each item of the test.

[1-3-5 (2). Supply Unit 373]

The supply unit 373 is configured to supply, to the learning model 371, the test results of the plurality of items acquired by the result acquisition unit 305 (the test result of the first inspection as an example in the present embodiment). The supply unit 373 may supply the item ID of the item together with the test result of each item.

[1-3-5 (3). Reproducibility Acquisition Unit 375]

The reproducibility acquisition unit 375 is configured to acquire the reproducibility from the prediction result of the reinspection output by the learning model 371 according to the supply unit 373 supplying the test results of the plurality of items to the learning model 371. The reproducibility acquisition unit 375 may acquire the reproducibility by performing four arithmetic operations or the like on a value of the prediction result of the reinspection, or may acquire the value of the prediction result itself as the reproducibility.

The reproducibility acquisition unit 375 supplies the acquired reproducibility to the prediction unit 311 and the first determination unit 315. As an example in the present embodiment, the reproducibility of each item is supplied to the prediction unit 311 regardless of the test result of the first inspection, and the reproducibility of the item that has failed the first inspection (also referred to as a failed item in the first inspection) is supplied to the first determination unit 315.

[1-3-6. Lower Limit Value Acquisition Unit 309]

The lower limit value acquisition unit 309 is configured to acquire an allowable lower limit value of a rate of the device under measurement 100 that passes the test. The allowable lower limit value may be set by an operator of the determination apparatus 300 based on the yield of the device under measurement 100 to pass the test and the like. The allowable lower limit value may be 10% as an example. The lower limit value acquisition unit 309 may supply the acquired allowable lower limit value to the threshold value determination unit 313.

[1-3-6. Prediction Unit 311] The prediction unit 311 is configured to calculate, based on the reproducibility of each item, among the devices under measurement 100 that have failed the test (the first inspection as an example in the present embodiment) of the corresponding item, the number of predicted passes of the device under measurement 100 that is predicted to pass at least the reinspection of the item. For example, the prediction unit 311 may calculate the number of predicted passes of the devices under measurement 100 that is predicted to pass the entire reinspection.

The prediction unit 311 may calculate the number of predicted passes based on the reproducibility supplied from the calculation unit 307. The prediction unit 311 may supply the threshold value determination unit 313 with the reproducibility and the number of predicted passes for each item in association with each other.

[1-3-6. Threshold Value Determination Unit 313]

The threshold value determination unit 313 determines a threshold value for determining whether to perform the reinspection from the reproducibility of each item and the number of predicted passes. As an example in the present embodiment, the threshold value may be a reproducibility value. The threshold value determination unit 313 may supply the determined threshold value to the first determination unit 315.

[1-3-6. First Determination Unit 315]

The first determination unit 315 is configured to determine whether to reinspect the device under measurement 100 that has failed the test (the first inspection as an example in the present embodiment). The expression of failing the test may mean failing at least one item included in the test. The first determination unit 315 may perform a determination based on the reproducibility.

For example, the first determination unit 315 may determine, based on the reproducibility for each item, whether to reinspect the device under measurement 100 that has failed the test of the corresponding item. As an example in the present embodiment, the first determination unit 315 may perform the determination by using the test result of each item that is supplied from the result acquisition unit 305, the item ID of the item, and the device ID of the device under measurement 100. The first determination unit 315 may use the learning model 371 that has learned the reproducibility, and perform the determination based on the reproducibility which is output from the learning model 371. The first determination unit 315 may use, for the determination, the threshold value determined by the threshold value determination unit 313.

In a case of determining to perform the reinspection, the first determination unit 315 may supply, to the test apparatus 200, the device ID of the device under measurement 100 to be reinspected. Thereby, the test apparatus 200 reinspects the device under measurement 100 that is a target. The reinspection may be repeated for all the items of the test.

With the determination apparatus 300 described above, based on the reproducibility of the test result, the determination is performed over whether to reinspect the device under measurement 100 that has failed the test. Therefore, it is possible to efficiently perform the reinspection by saving the trouble of the unnecessary reinspection of the device under measurement 100 that fails the reinspection as well.

In addition, the determination is performed, based on the reproducibility of each item, over whether to reinspect the device under measurement 100 that has failed the test of the corresponding item, and thus it is possible to reliably save the trouble of performing the unnecessary reinspection.

In addition, the determination is performed by using the learning model 371 that has learned the reproducibility for each item, and thus it is possible to reflect, in the determination, a potential relationship of the test results between the items. Therefore, it is possible to enhance accuracy of the determination and to efficiently perform the reinspection.

In addition, the test results of the plurality of items are input to the learning model 371 and the prediction result of the reinspection showing the reproducibility is acquired, and thus it is possible to reliably acquire the highly accurate reproducibility and perform the determination.

In addition, the test result of each item is extracted from the data file of the test and is stored in the storage unit 303, and the stored test result is acquired by the result acquisition unit 305. Therefore, unlike a case where the result acquisition unit 305 directly acquires the data file from the test apparatus 200 and extracts the test result, it is possible to increase a speed of the processing by the result acquisition unit 305.

2. Test Apparatus 200

Figure 2:
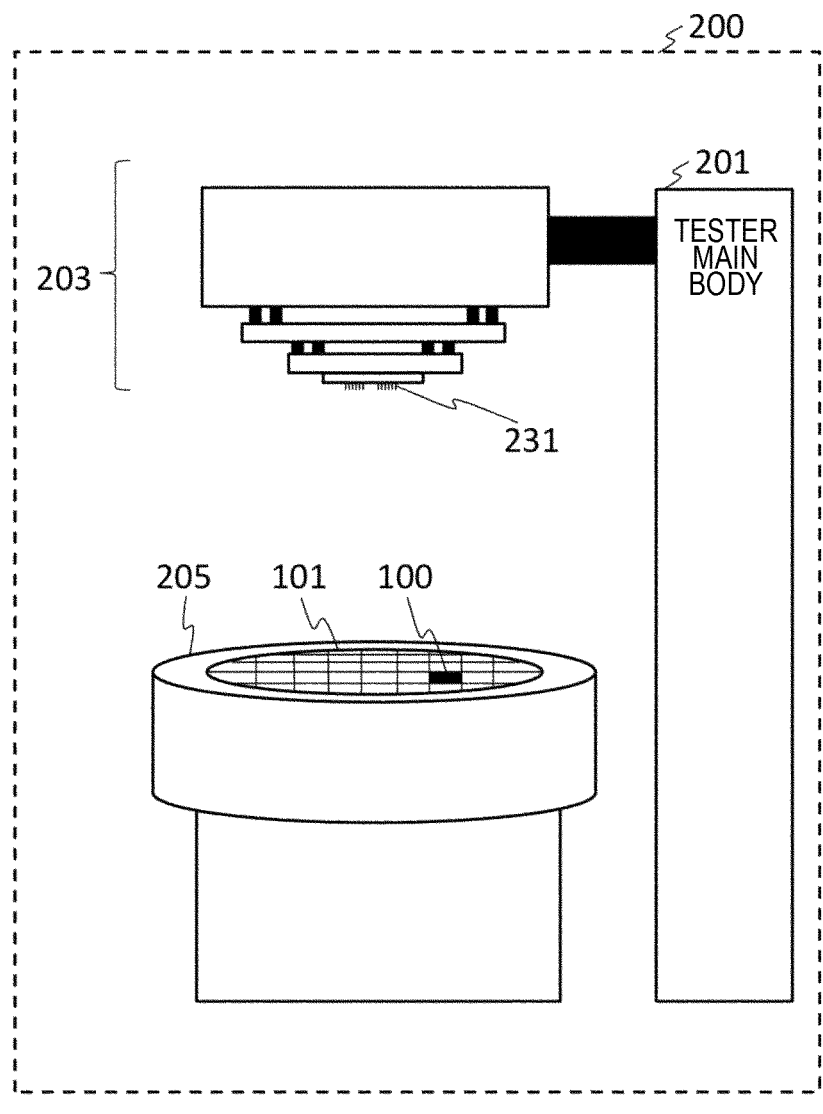
FIG. 2 shows a test apparatus 200 together with a wafer 101.

FIG. 2 shows a test apparatus 200 together with a wafer 101. The test apparatus 200 includes a tester main body 201, a test head 203, and a prober 205.

The tester main body 201 is a main body of the test apparatus 200, and controls various tests. For example, the tester main body 201 may perform the first inspection of the device under measurement 100, and reinspect the device under measurement 100 based on a signal from the determination apparatus 300.

The test head 203 is connected to the tester main body 201 via a cable, and is configured to be able to be driven between a test position at which the test is performed on the device under measurement 100, and a retreat position at which the test is not performed. In a case of performing the test, the test head 203 transmits a test signal to the device under measurement 100 at the test position based on the control by the tester main body 201, receives a response signal from the device under measurement 100, and relays the received response signal to the tester main body 201. The test head 203 may have a plurality of probe needles 231 to be brought into contact with the device under measurement 100 for electrical contact.

The plurality of probe needles 231 are arranged to respectively correspond to a plurality of electrode pads in some (four in the present embodiment) of the plurality of devices under measurement 100 formed in the wafer 101.

The prober 205 conveys the wafer 101 and places the wafer 101 on a stage, and aligns the wafer 101 with the test head 203.

3. Operation

Figure 3:
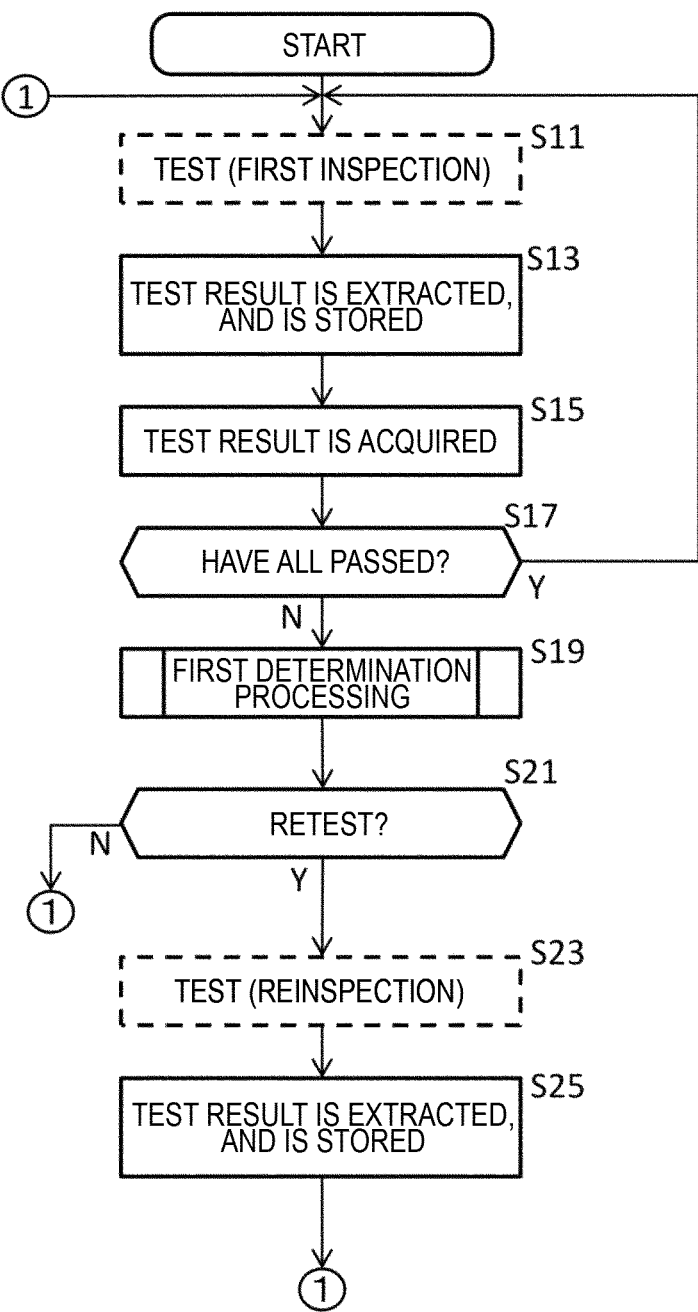
FIG. 3 shows an operation of a determination apparatus 300 together with an operation of the test apparatus 200.

FIG. 3 shows an operation of a determination apparatus 300 together with an operation of the test apparatus 200. The determination apparatus 300 determines whether the device under measurement 100 needs to be reinspected by performing processing of step S11 to processing of step S25. It should be noted that a broken line frame in the figure indicates the processing by the test apparatus 200.

In step S11, the test apparatus 200 tests each of the plurality of devices under measurement 100. As an example in the present embodiment, the test apparatus 200 tests each of the reference number of devices under measurement 100, that is, all the devices under measurement 100 on the wafer 101. When the processing of step S11 is performed for the second time or later, the test apparatus 200 may perform the first inspection on the plurality of devices under measurement 100 that have not yet been tested.

In step S13, the extraction unit 301 acquires the data file (the STDF file as an example in the present embodiment) from the test apparatus 200, and extracts the test result of each item, and the storage unit 303 stores the test result. As an example in the present embodiment, the device ID of the device under measurement 100, the item ID of the test, and the like may be further extracted by the extraction unit 301, and stored in the storage unit 303.

In step S15, the result acquisition unit 305 acquires the test result from the storage unit 303. The result acquisition unit 305 may further acquire the device ID of the device under measurement 100, the item ID of the test, and the like together with the test result.

In step S17, the first determination unit 315 determines whether all of the reference number of the devices under measurement 100 tested in step S11 have passed the tests. As an example in the present embodiment, the first determination unit 315 determines whether all the devices under measurement 100 on the wafer 101 have passed all the items of the tests. If it is determined in step S17 that all the devices under measurement 100 have passed the tests (step S17; Yes), the processing proceeds to step S11. Thereby, the test apparatus 200 tests the device under measurement 100 on the next wafer 101. If it is determined in step S17 that all the devices under measurement 100 have not passed the tests (step S17; No), the processing proceeds to step S19.

In step S19, the first determination unit 315 performs the determination processing over whether to reinspect the device under measurement 100 that has failed the test in step S11. The details of the processing of this step S19 will be described below.

In step S21, the first determination unit 315 determines whether the determination to perform the reinspection has been performed. If the determination to reinspect none of the devices under measurement 100 (step S21; Yes) has been performed, the processing proceeds to step S11. Thereby, the test apparatus 200 tests the device under measurement 100 on the next wafer 101. If the determination to reinspect at least one device under measurement 100 has been performed in step S21 (step S21; Yes), the processing proceeds to step S23.

In step S23, the test apparatus 200 reinspects one or more devices under measurement 100 on which the determination to perform the reinspection has been performed. The reinspection may be performed for each item of the test.

When the test apparatus 200 is capable of testing the plurality of devices under measurement 100 at the same time, the test apparatus 200 may test, among these devices under measurement 100, only the device under measurement 100 that is determined to be reinspected. As an example, when the plurality of probe needles 231 of the test apparatus 200 are capable of contacting the devices under measurement 100 different from each other, the test apparatus 200 may respectively bring the probe needles 231 into contact with the devices under measurement 100 at corresponding positions, and cause a current to flow only through the probe needle 231 that comes into contact with the device under measurement 100 to be reinspected.

In step S25, similarly to step S13, the extraction unit 301 acquires the data file (the STDF file as an example in the present embodiment) from the test apparatus 200, and extracts the test result of each item, and the storage unit 303 stores the test result. If the processing of step S25 ends, the processing may proceed to step S11. Thereby, the test apparatus 200 tests the device under measurement 100 on the next wafer 101.

[4-1. First Determination Processing]

Figure 4:
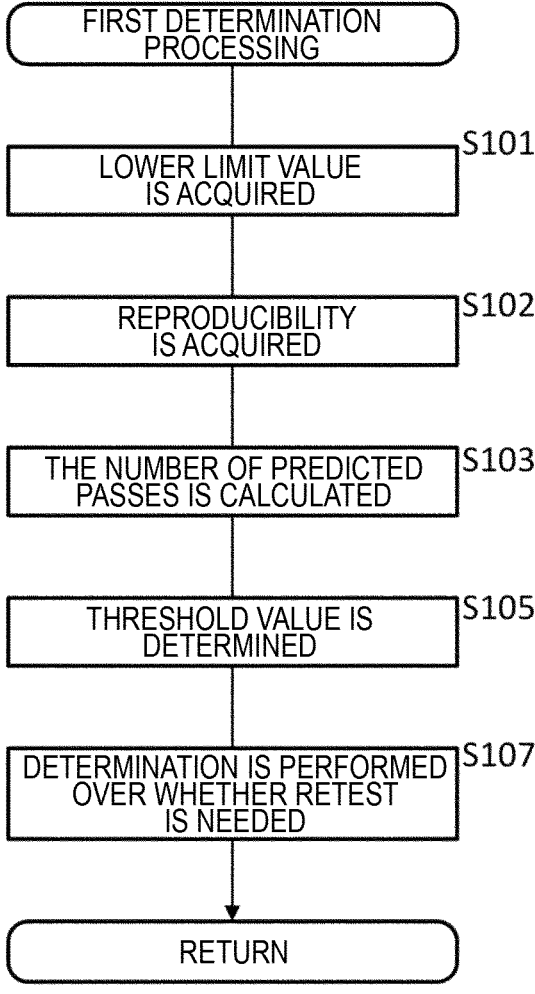
FIG. 4 shows first determination processing.

FIG. 4 shows first determination processing. The determination apparatus 300 determines whether to reinspect the device under measurement 100 by performing processing of step S101 to processing of step S107.

In step S101, the lower limit value acquisition unit 309 acquires the allowable lower limit value preset by the operator of the determination apparatus 300. When the allowable lower limit value is internally stored in the determination apparatus 300, the lower limit value acquisition unit 309 may acquire the allowable lower limit value.

In step S102, the calculation unit 307 calculates the reproducibility for each of the plurality of items. The calculation unit 307 may calculate the reproducibility by using the learning model 371.

In step S103, the prediction unit 311 calculates the number of predicted passes for each item based on the reproducibility of each item. As an example, when the reproducibility indicates the reproduction rate of a failure, the prediction unit 311 may calculate the number of predicted passes for each item from the following Equation (1). When the reproducibility indicates the number of failures predicted in the reinspection, the prediction unit 311 may calculate the number of predicted passes for each item from the following Equation (2).

The number of predicted passes=the number of failures in the first inspection×(1-reproduction rate) (1). The number of predicted passes=the number of failures in the first inspection–the number of failures predicted in the reinspection (2).

In step S105, the threshold value determination unit 313 determines the threshold value for determining whether to perform the reinspection from the reproducibility of each item and the number of predicted passes. For example, the threshold value determination unit 313 may detect, in a case of integrating the number of predicted passes in order according to a magnitude of corresponding reproducibility of each item, the number of predicted passes when an integration result reaches a number corresponding to the allowable lower limit value. Instead of this, the threshold value determination unit 313 may detect the number of predicted passes immediately before the integration result reaches the number corresponding to the allowable lower limit value. The threshold value determination unit 313 may determine, as the threshold value, a value based on the reproducibility corresponding to the number of predicted passes, which is detected.

Here, the expression of integrating the number of predicted passes in order according to a magnitude of the reproducibility may mean integrating the number of predicted passes in descending order or ascending order of the reproducibility, and means integrating the number of predicted passes in descending order of the reproducibility, as an example in the present embodiment. The value based on the reproducibility may be a value obtained by performing four arithmetic operations or the like on the value of the reproducibility, but is the value itself of the reproducibility as an example in the present embodiment. In this case, by comparing the threshold value with the reproducibility of each item, it is possible to determine whether to reinspect the device under measurement 100 that has failed the item.

In step S107, the first determination unit 315 determines, for each item, whether to reinspect the device under measurement 100 that has failed the test of the item. The first determination unit 315 may perform the determination by using the reproducibility of each failed item in the first inspection, which is supplied from the reproducibility acquisition unit 375 of the calculation unit 307, and the threshold value of the reproducibility, which is supplied from the threshold value determination unit 313.

When the reproducibility of the failed item in the first inspection is larger than the threshold value, the first determination unit 315 may determine not to reinspect the device under measurement 100 that has failed the item, and when the reproducibility of the failed item in the first inspection is smaller than the threshold value, the first determination unit 315 may determine to reinspect the device under measurement 100 that has failed the item. The first determination unit 315 may detect, among the respective device IDs acquired from the result acquisition unit 305, the device ID of the device under measurement 100 that has failed the item of the reproducibility in which the reproducibility of the failed item in the first inspection is smaller than the threshold value, and supply the detected device ID to the test apparatus 200 as the target for the reinspection.

With the first determination processing described above, in the case of integrating the number of predicted passes of each item in order according to the magnitude of each reproducibility, the reproducibility, which corresponds to the number of predicted passes when or immediately before the integration result reaches the number corresponding to the allowable lower limit value of the pass rate, is detected, and thus the threshold value that does not require the reinspection to satisfy the allowable lower limit value is detected. Therefore, by determining whether the reinspection is needed by using this threshold value, the rate of the device under measurement 100 to pass the test can be set to be higher than or equal to the allowable lower limit value.

It should be noted that the reproducibility of the test may be different depending on the processing step performed on the device under measurement 100. For example, the reproducibility may be different between the device under measurement 100 on which low temperature treatment has been performed, and the device under measurement 100 on which high temperature treatment has been performed. Therefore, when the devices under measurement 100 on which processing steps different from each other have been performed are included in the test target, it is preferable that the first determination processing is performed by using the different learning model 371 for each processing step which is performed.

5. Modification Example

Figure 5:
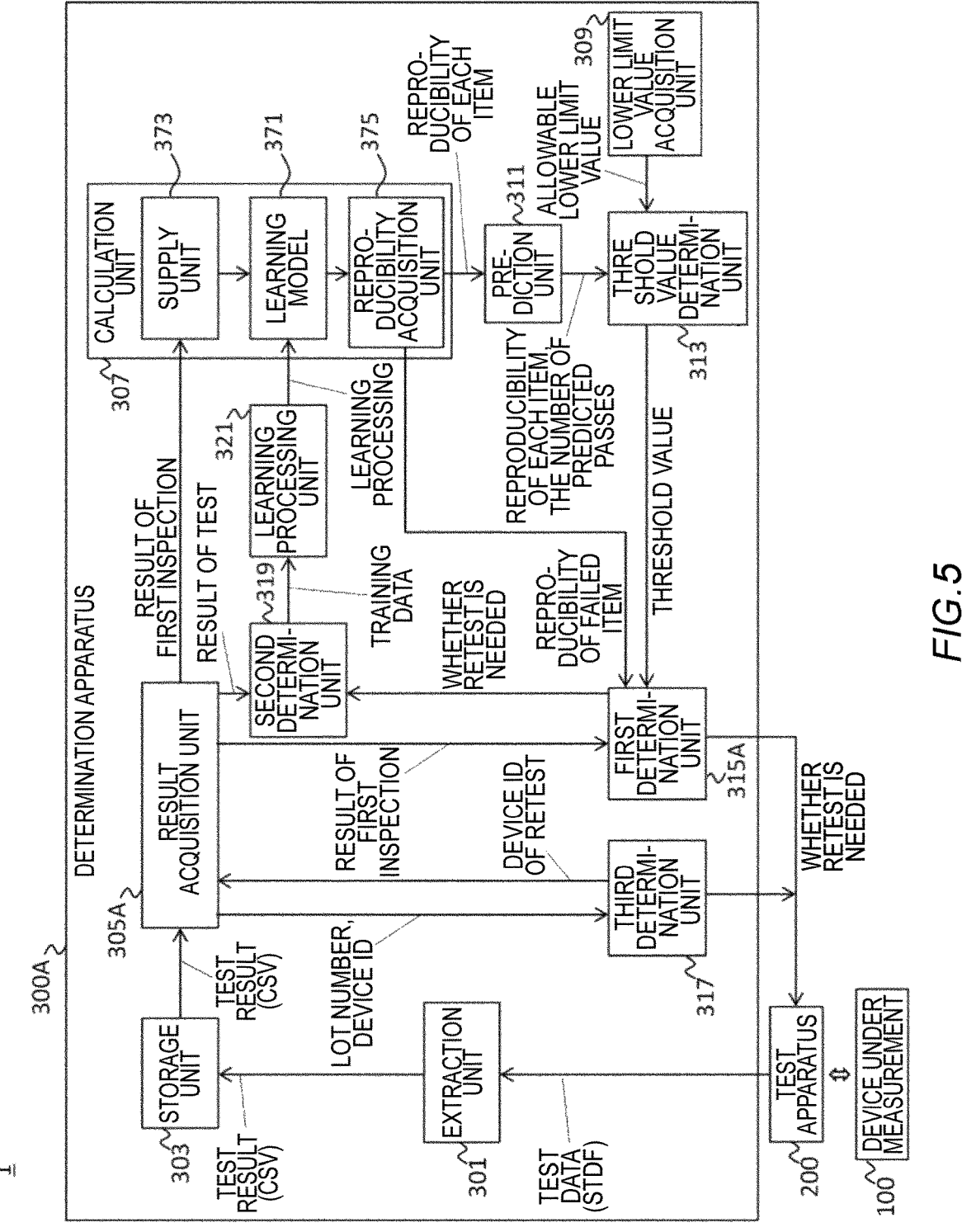
FIG. 5 shows a determination apparatus 300A according to a modification example together with the test apparatus 200 and a device under measurement 100.

FIG. 5 shows a determination apparatus 300A according to a modification example together with the test apparatus 200 and a device under measurement 100. The determination apparatus 300A further has a first determination unit 315A, a result acquisition unit 305A, a third determination unit 317, a second determination unit 319, and a learning processing unit 321. It should be noted that in the determination apparatus 300A according to the present modification example, the same signs and numerals are given to those having substantially the same configuration as the determination apparatus 300 shown in FIG. 1, and the description thereof will be omitted.

[5-2. First Determination Unit 315A]

The first determination unit 315A has a configuration similar to the first determination unit 315 described above, but supplies the determination result to the second determination unit 319 as well.

[5-3. Result Acquisition Unit 305A]

The result acquisition unit 305A has a configuration similar to the result acquisition unit 305 described above, but further acquires the lot number of the device under measurement 100 from the storage unit 303 together with the test result or the like. In addition, the result acquisition unit 305A supplies, to the third determination unit 317, the lot number and the device ID in association with each other. In addition, the result acquisition unit 305A acquires, from the storage unit 303, the test result of the first inspection corresponding to the device ID which is supplied from the third determination unit 317 and the test result of the reinspection in association with the item ID of the test item, and supplies the acquired test results to the second determination unit 319.

[5-4. Third Determination Unit 317]

The third determination unit 317 determines whether to reinspect the device under measurement 100. The third determination unit 317 may determine to perform the reinspection regardless of a determination result of the first determination unit 315. The third determination unit 317 may determine to perform the reinspection according to the test being performed on the device under measurement 100 included in the lot at an interval of a reference number (four as an example in the present embodiment). For example, in a case where the first inspection is performed on each device under measurement 100 included in a next lot (a fifth lot as an example in the present embodiment) of the reference number of lots, the third determination unit 317 may determine to reinspect the device under measurement 100. As an example, the third determination unit 317 may perform the determination between step S15 and step S17 described above.

The third determination unit 317 may detect a change of the lot number based on the lot number which is supplied from the result acquisition unit 305A, and count the number of tested lots. The third determination unit 317 may determine to reinspect the device under measurement 100 on which the first inspection is performed between from a time when the number of tested lots reaches the reference number (four in the present embodiment) to a time when a next number (five in the present embodiment) is reached. The third determination unit 317 may extract, from the device ID which is supplied from the result acquisition unit 305A, the device ID of the device under measurement 100 to be reinspected, and supply the extracted device ID to the test apparatus 200. Thereby, the test apparatus 200 reinspects the device under measurement 100 that is a target.

The third determination unit 317 may also supply, to the result acquisition unit 305A, the device ID of the device under measurement 100 to be reinspected. Thereby, the test result of the first inspection corresponding to the device ID, and the test result of the reinspection are associated with the item ID of each item of the test, and are supplied to the second determination unit 319.

[5-5. Second Determination Unit 319] The second determination unit 319 is configured to determine whether to retrain the learning model 371 by using the result of the reinspection and the determination result of the first determination unit 315. The result of the reinspection which is used by the second determination unit 319 may be the result of the reinspection performed by the third determination unit 317, but may be the result of the reinspection performed by the first determination unit 315.

The second determination unit 319 includes may calculate values of TP (True Positive), TN (True Negative), FP (False Positive), and FN (False Negative) from the determination result (as an example in the present embodiment, the device ID of the device under measurement 100 determined to be the target of the reinspection) of the first determination unit 315, and the test result of the reinspection for each device ID which is supplied from the result acquisition unit 305A. The TP may be the number of the devices under measurement 100 that have been determined to be reinspected, and have passed the reinspection. The TN may be the number of the devices under measurement 100 that have been determined not to be reinspected, and have failed the reinspection. The FP may be the number of the devices under measurement 100 that have been determined to be reinspected, and have failed the reinspection. The FN may be the number of the devices under measurement 100 that have been determined not to be reinspected, and have passed the reinspection.

The second determination unit 319 may determine to perform the retraining in a case where at least one condition of a condition for preventing a decrease in yield (also referred to as a yield condition) and a condition for reducing the number of reinspections (also referred to as a retest reduction condition) is not satisfied. It should be noted that the yield may be the rate of the device under measurement 100 that passes the test (or the reinspection), among all the devices under measurement 100 that are provided to the test.

The yield condition may be a condition that a ratio between the number (FN+TP) of the devices under measurement 100 that pass when all the devices under measurement 100 are reinspected, and the number (TP) of the devices under measurement 100 that have been determined to be reinspected and have passed the reinspection is larger than a threshold value. That is, the yield condition may be expressed, by using the threshold value (TH1), as $TP/(FN+TP) \geq TH1$.

The reinspection reduction condition may be a condition that a ratio between the number (TN+FP+FN+TP) of the devices under measurement 100 that have failed the first inspection, and the number (TN+FN) of the devices under measurement 100 on which the reinspection has not been performed is larger than a threshold value. That is, the reinspection reduction condition may be expressed, by using the threshold value (TH2), as $(TN+FN)/(TN+FP+FN+TP) \geq TH2$.

In a case of determining to perform the retraining, the second determination unit 319 may supply, to the learning processing unit 321, the training data which is extracted from the data acquired from the result acquisition unit 305A.

[5-6. Learning Processing Unit 321]

The learning processing unit 321 is configured to execute learning processing of the learning model 371 by using the training data including at least an item ID of the failed item among the respective items of the test, and the result of the reinspection. The learning processing unit 321 may execute the learning processing of the learning model 371 according to a determination result by the second determination unit 319. As an example, the learning processing unit 321 may perform the learning processing according to the training data being supplied from the second determination unit 319. The learning processing unit 321 may execute the learning processing by further using the training data further including the position of the device under measurement 100 on the wafer, the amount of deviation between the measured value and the ideal value, or the like. The learning processing unit 321 may acquire the data from the result acquisition unit 305A or the second determination unit 319.

With the determination apparatus 300A described above, the learning processing of the learning model 371 is performed by the learning processing unit 321, and thus it is possible to further enhance the accuracy of the reproducibility.

In addition, the second determination unit 319 is configured to determine whether to retrain the learning model 371 by using the result of the reinspection and the determination result of the first determination unit 315. Therefore, when the determination accuracy of the first determination unit 315 is low, it is possible to retrain the learning model 371, and to enhance the determination accuracy of the first determination unit 315.

In addition, the reinspection is forcibly performed every time the devices under measurement 100 of the reference number of lots are tested, the accuracy of the reproducibility and the learning accuracy of the learning model 371 can be reliably maintained to be high.

6. Other Modification Example

It should be noted that in the above-described embodiment and the modification example, the determination apparatus 300 has been described to have the calculation unit 307, the lower limit value acquisition unit 309, the prediction unit 311, and the threshold value determination unit 313; however, the determination apparatus 300 may not have these. For example, the determination apparatus 300 may acquire the reproducibility, the number of predicted passes, and the calculation result of the threshold value from the calculation unit 307, the prediction unit 311, and the threshold value determination unit 313 that are externally connected. In addition, the determination apparatus 300 may perform the determination by the first determination unit 315 without using the number of predicted passes or the threshold value. As an example, the first determination unit 315 may determine not to reinspect the device under measurement that has failed the reference number of items with the high reproducibility.

In addition, the result acquisition unit 305 has been described to acquire the test result or the like from the test apparatus 200 via the extraction unit 301 and the storage unit 303; however, the result acquisition unit 305 may directly acquire the test result or the like from the test apparatus 200. In this case, the result acquisition unit 305 may acquire the test data of the data file (the STDF file as an example), and extract the test result or the like from the data file. In this case, the determination apparatus 300 may not have the extraction unit 301.

In addition, the number of predicted passes for each item which is calculated by the prediction unit 311 is described as the number of predicted passes of the device under measurement 100 that is predicted to pass the reinspection of the item, among the devices under measurement 100 that have failed the first inspection of the item; however, a number indicating another value may be used. For example, the number of predicted passes for each item may be the number of the devices under measurement 100 that are predicted to pass the entire reinspection among the devices under measurement that have failed the first inspection of the item.

In addition, the reproducibility has been described as the value for each item of the test, a value corresponding to the entire test may be used. In this case, when the result of the first inspection is a failure, the reproducibility may indicate that the result of the reinspection is a failure.

In addition, the calculation unit 307 has been described to calculate the reproducibility by using the learning model 371; however, the calculation unit 307 may calculate the reproducibility without using the learning model 371. For example, the calculation unit 307 may calculate the reproducibility from the test results of the plurality of tests on the plurality of devices under measurement 100, and test results of a plurality of reinspections. As an example, the calculation unit 307 may use the results of the first inspection and the reinspection for the plurality of devices under measurement 100, and calculate the reproduction rate from a ratio between the number of failures in the first inspection and the number of failures in the reinspection, for each item. This makes it possible to acquire a statistical reproduction rate based on the results of the first inspection for the plurality of devices under measurement 100. In the case of calculating the reproducibility without using the learning model 371, it is not necessary to input the test result of the first inspection for each device under measurement 100 to the learning model 371 each time, and thus the reproduction rate may be calculated for each item in advance and stored internally in the determination apparatus 300. In addition, the second determination unit 319 may determine whether to update the calculated reproducibility by using the result of the reinspection and the determination result of the first determination unit 315. In this case, the calculation unit 307 may update the reproducibility according to the determination result by the second determination unit 319. It should be noted that a determination method by the second determination unit 319 may be similar to that in the modification example described above.

It should be noted that at least some of functional units in the test apparatus 200 and the determination apparatus 300, 300A of the test system 1 may be realized by a computer that executes a program. The computer may perform a calculation and logical processing according to a program created in advance, and may be, as an example, a dedicated computer for a special purpose that has a microprocessor, may be a general-purpose computer, or may be another computer.

Various embodiments of the present invention may be described with reference to flowcharts and block diagrams whose blocks may represent (1) steps of processes in which operations are executed or (2) sections of apparatuses responsible for executing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having instructions stored in the tangible device comprises an article of manufacture including instructions which can be executed to create means for executing operations specified in the flowcharts or block diagrams. Examples of the computer-readable medium may include an electronic storage medium, a magnetic storage medium, an optical storage medium, an electromagnetic storage medium, a semiconductor storage medium, etc. Specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

The computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++ or the like, and conventional procedural programming languages, such as the "C" programming language or similar programming languages.

Computer-readable instructions may be provided to a processor of a programmable data processing apparatus such as a general-purpose computer, special purpose computer, or another computer, or to programmable circuitry, locally or via a local area network (LAN), wide area network (WAN) such as the Internet, etc., so that the computer-readable instructions are executed to create means for executing operations specified in the flowcharts or block diagrams. Examples of the processor include a computer processor, a processing unit, a microprocessor, a digital signal processor, a controller, a microcontroller, and the like.

Figure 6:
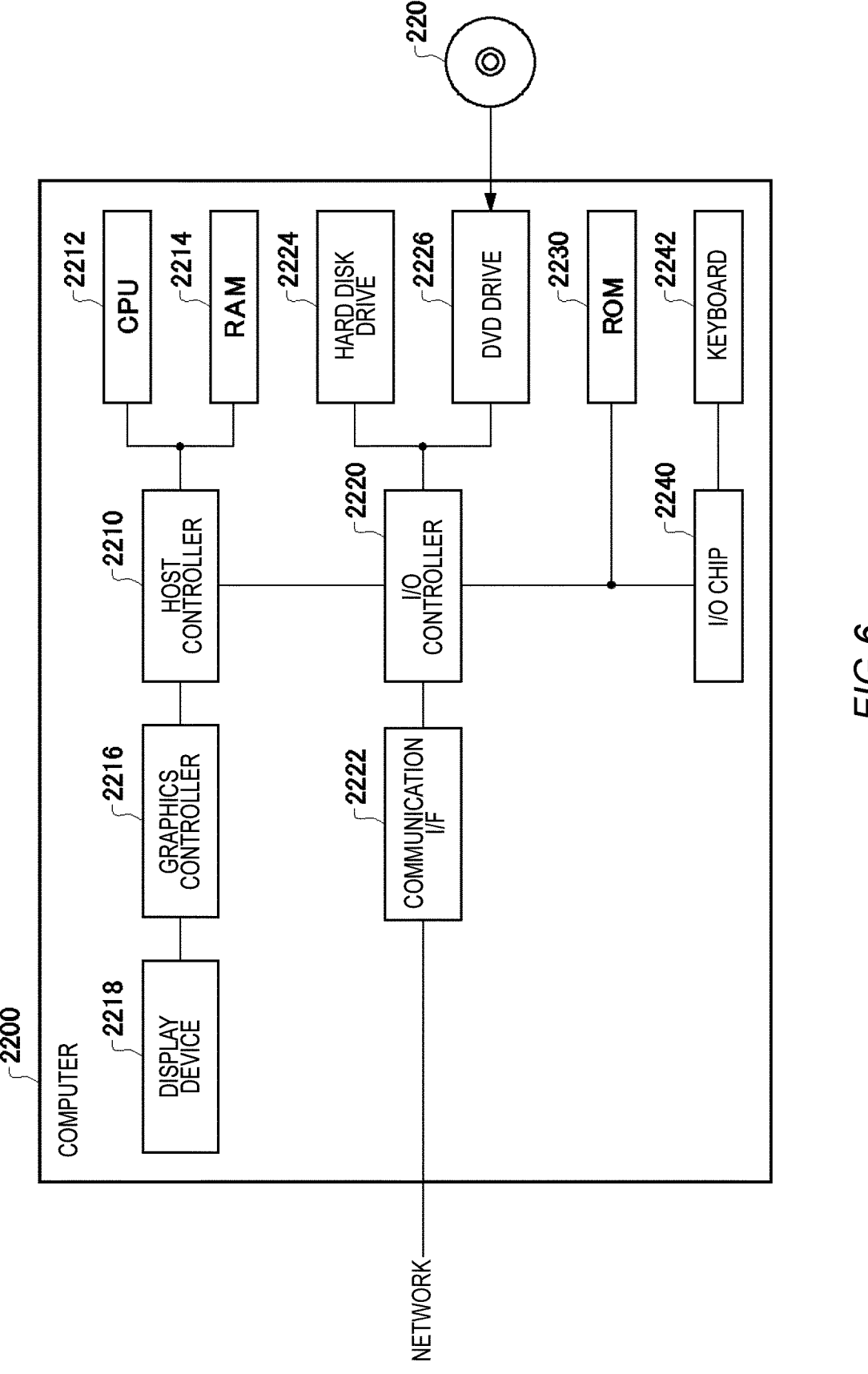
FIG. 6 shows an example of a computer 2200 in which a plurality of aspects of the present invention may be entirely or partially embodied.

FIG. 6 shows an example of a computer 2200 in which a plurality of aspects of the present invention may be entirely or partially embodied. A program that is installed in the computer 2200 can cause the computer 2200 to function as or execute operations associated with apparatuses according to the embodiments of the present invention or one or more sections of the apparatuses, or can cause the computer 2200 to perform the operations or the one or more sections thereof, and/or can cause the computer 2200 to execute processes according to the embodiments of the present invention or steps of the processes. Such a program may be executed by a CPU 2212 to cause a computer 2200 to execute certain operations associated with some or all of the blocks of flowcharts and block diagrams described herein.

The computer 2200 according to the present embodiment includes the CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in the graphics controller 2216 itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from a DVD-ROM 2201, and provides the hard disk drive 2224 with the programs or the data via the RAM 2214. The IC card drive reads the programs and the data from the IC card, and/or writes the programs and the data to the IC card.

The ROM 2230 stores therein a boot program or the like executed by the computer 2200 at the time of activation, and/or a program depending on the hardware of the computer 2200. The input/output chip 2240 may also connect various input/output units to the input/output controller 2220 via a parallel port, a serial port, a keyboard port, a mouse port, and the like.

A program is provided by the computer-readable medium such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. The information processing written in these programs is read into the computer 2200, resulting in cooperation between a program and the above-mentioned various types of hardware resources. An apparatus or method may be constituted by realizing the operation or processing of information in accordance with the usage of the computer 2200.

For example, when a communication is executed between the computer 2200 and an external device, the CPU 2212 may execute a communication program loaded in the RAM 2214, and instruct the communication interface 2222 to process the communication based on the processing written in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (the DVD-ROM 2201), the IC card, etc., and execute various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may execute various types of processing on the data read from the RAM 2214 to write back a result to the RAM 2214, the processing being described throughout the present disclosure, specified by instruction sequences of the programs, and including various types of operations, information processing, condition determinations, conditional branching, unconditional branching, information retrievals/replacements, or the like. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-described program or software modules may be stored in the computer-readable medium on the computer 2200 or near the computer 2200. In addition, a recording medium such as a hard disk or a RAM provided in a server system connected to a dedicated communication network or the Internet can be used as a computer-readable medium, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1. Test System
100 device under measurement
101 wafer
200 test apparatus
201 Tester main body
203 test head
205 prober
231 Probe needle
300 determination apparatus
301 extraction unit
303 storage unit
305 result acquisition unit
307 calculation unit
309 lower limit value acquisition unit
311 prediction unit
313 threshold value determination unit
315 first determination unit
317 third determination unit
319 second determination unit
321 learning processing unit
371 learning model
373 supply unit
375 reproducibility acquisition unit
2200 computer
2201 DVD-ROM
2210 host controller
2212 CPU
2214 RAM
2216 graphics controller
2218 display device
2220 input/output controller
2222 communication interface

17

2224 hard disk drive
2226 DVD-ROM drive
2230 ROM
2240 input/output chip
2242 keyboard

What is claimed is:

1. A testing apparatus comprising:
a main body;
a test head operatively connected to the main body configured to transmit test signals to a device under measurement; and
a determination apparatus having at least one processor configured to:
acquire test results of tests performed using the test head on a plurality of items which are performed on the device under measurement;
perform a first determination as to whether to retest the device under measurement that has failed the tests; and
if it is determined to retest the device under measurement, signal to the main body to retest the device under measurement;
wherein
the at least one processor:
performs the first determination based on reproducibility of the test results in a case where the tests have been performed on a plurality of ones of the devices under measurement multiple times;
performs the first determination, based on the reproducibility, where ones of the device under measurement that have failed a test of a corresponding item;
performs the first determination by using a learning model that has learned the reproducibility;
outputs a prediction result of the retest according to inputs of the test results of the plurality of items;
supplies, to the learning model, the test results of the acquired plurality of items of ones of the device under measurement;
executes learning processing of the learning model by using training data including at least an item ID of a failed item among the plurality of items, and a result of a retest; and
acquires the reproducibility from the prediction result of the retest which is output by the learning model according to the test results of the plurality of items being supplied to the learning model.

2. The testing apparatus according to claim 1, wherein the at least one processor is further configured to:
perform a second determination relating to whether to retrain the learning model by using the result of the retest and the first determination, and;
execute the learning processing of the learning model according to the second determination.

3. The testing apparatus according to claim 1, wherein the at least one processor is further configured to
calculate the reproducibility from the test results of the plurality of tests on ones of the device under measurement and test results of a plurality of retests.

4. The testing apparatus according to claim 3, wherein the at least one processor is further configured to:
perform a second determination as to whether to update the reproducibility by using a result of the retest and the first determination and
update the reproducibility according to the second determination.

5. The testing apparatus according to claim 2, wherein the at least one processor is further configured to:

perform a third determination as to whether to retest the device under measurement, regardless of the first determination, according to tests being performed on ones of the device under measurement included in a lot at an interval of a reference number, and
perform the second determination by using a result of the retest.

6. The testing apparatus according to claim 4, wherein the at least one processor is further configured to:
perform a third determination as to whether to retest the device under measurement, regardless of the first determination, according to the tests being performed on ones of the device under measurement included in a lot at an interval of a reference number, and
perform the second determination by using a result of the retest.

7. The testing apparatus according to claim 1, wherein the at least one processor is further configured to:
acquire an allowable lower limit value of a rate of a device under measurement that passes the test; and
calculate, based on the reproducibility of each item, among devices under measurement that have failed the test of a corresponding item, a number of at least one predicted pass of a device under measurement that is predicted to pass at least the retest of the item, wherein
as a threshold value, the first testing, in a case of integrating the number of at least one predicted pass in order according to a magnitude of corresponding reproducibility of each item, a value based on the reproducibility corresponding to the number of at least one predicted pass when or immediately before an integration result reaches a number corresponding to the allowable lower limit value.

8. The testing apparatus according to claim 1, wherein the at least one processor is further configured to:
acquire an allowable lower limit value of a rate of a device under measurement that passes the test; and
calculate, based on the reproducibility of each item, among devices under measurement that have failed the test of a corresponding item, a number of at least one predicted pass of a device under measurement that is predicted to pass at least the retest of the item, wherein
as a threshold value, the first determination uses, in a case of integrating the number of at least one predicted pass in order according to a magnitude of corresponding reproducibility of each item, a value based on the reproducibility corresponding to the number of at least one predicted pass when or immediately before an integration result reaches a number corresponding to the allowable lower limit value.

9. The testing apparatus according to claim 1, wherein the at least one processor is further configured to:
acquire an allowable lower limit value of a rate of a device under measurement that passes the test; and
calculate, based on the reproducibility of each item, among devices under measurement that have failed the test of a corresponding item, a number of at least one predicted pass of a device under measurement that is predicted to pass at least the retest of the item, wherein
as a threshold value, the first determination uses, in a case of integrating the number of at least one predicted pass in order according to a magnitude of corresponding reproducibility of each item, a value based on the reproducibility corresponding to the number of at least one predicted pass when or immediately before an integration result reaches a number corresponding to the allowable lower limit value.

10. The testing apparatus according to claim 1, wherein the at least one processor is further configured to:

acquire a data file including the test results, and extract the test results of each item from the data file; and store the extracted test results in storage, wherein the test results of the plurality of items are acquired from the storage.

11. The testing apparatus according to claim 1, wherein the at least one processor is further configured to:

acquire a data file including the test results, and extract the test results of each item from the data file; and store the extracted test results in storage, wherein the test results of the plurality of items are acquired from the storage.

12. The testing apparatus according to claim 1, wherein the at least one processor is further configured to:

acquire a data file including the test results, and extract the test results of each item from the data file; and store the extracted test results in storage, wherein the acquired test results of the plurality of items are acquired from the storage.

13. A test system comprising:

the determination apparatus according to claim 1; and a test apparatus that uses the at least one processor to perform the tests on the plurality of items on the device under measurement.

14. A testing method comprising:

acquiring test results of tests performed using a test head configured to transmit test signals on a plurality of items which are performed on a device under measurement;

first determining of whether to retest the device under measurement that has failed the tests and;

if it is determined to retest the device under measurement, signaling to a testing apparatus to retest the device under measurement;

wherein in the first determining, the determination is performed based on reproducibility of the test results in a case where the tests have been performed on a plurality of ones of the device under measurement multiple times;

in the first determining, the determination is performed, based on the calculated reproducibility, whether to retest ones of the device under measurement that have failed a test of a corresponding item; and in the first determining, the determination is performed by using a learning model that has learned the reproducibility;

outputting a prediction result of the retest according to inputs of the test results of the plurality of items;

supplying, to the learning model, the test results of the acquired plurality of items of ones of the device under measurement;

executing learning processing of the learning model by using training data including at least an item ID of a failed item among the plurality of items, and a result of a retest; and acquiring the reproducibility from the prediction result of the retest which is output by the learning model according to the test results of the plurality of items being supplied to the learning model.

15. A non-transitory computer-readable medium having stored thereon a testing program that is executed by a computer having at least one processor configured to:

acquire test results performed using a test head configured to transmit test signals of tests on a plurality of items which are performed on a device under measurement;

perform a first determination as to whether to retest the device under measurement that has failed the tests; and if it is determined to retest the device under measurement, signal to a testing apparatus to retest the device under measurement;

wherein the at least one processor:

performs the first determination based on reproducibility of the test results in a case where the tests have been performed on a plurality of ones of the devices under measurement multiple times;

performs the first determination, based on the reproducibility, where ones of the device under measurement that have failed a test of a corresponding item;

performs the first determination by using a learning model that has learned the reproducibility;

outputs a prediction result of the retest according to inputs of the test results of the plurality of items;

supplies, to the learning model, the test results of the acquired plurality of items of ones of the device under measurement;

executes learning processing of the learning model by using training data including at least an item ID of a failed item among the plurality of items, and a result of a retest; and acquires the reproducibility from the prediction result of the retest which is output by the learning model according to the test results of the plurality of items being supplied to the learning model.

16. A testing apparatus comprising:

a main body;

a test head operatively connected to the main body configured to transmit test signals to a device under measurement; and a determination apparatus having at least one processor configured to:

acquire test results of tests performed using the test head on a plurality of items which are performed on the device under measurement;

perform a first determination as to whether to retest the device under measurement that has failed the tests; and if it is determined to retest the device under measurement, signal to the main body to retest the device under measurement;

wherein the at least one processor:

performs the first determination based on reproducibility of the test results in a case where the tests have been performed on a plurality of ones of the devices under measurement multiple times;

performs the first determination, based on the reproducibility, where ones of the device under measurement have failed a test of a corresponding item;

performs the first determination by using a learning model that has learned the reproducibility;

calculates the reproducibility from the test results of the plurality of tests on ones of the device under measurement and test results of a plurality of retests;

performs a second determination as to whether to update the reproducibility by using a result of the retest and the first determination; and updates the reproducibility according to the second determination.

* * * * *